United States Patent

[11] 3,633,184

[72] Inventors Philip A. Harding
Palos Verdes Peninsula, Calif.;
George D. Kraft, Naperville, Ill.
[21] Appl. No. 842,591
[22] Filed July 17, 1969
[45] Patented Jan. 4, 1972
[73] Assignee Bell Telephone Laboratories, Incorporated
Murray Hill, Berkeley Heights, N.J.

[54] MEMORY WIRING ARRANGEMENT WITH CHANGEABLE COMMON MODE REJECTION CIRCUIT LOOP
18 Claims, 2 Drawing Figs.

[52] U.S. Cl. 340/174 DC, 340/174 CA, 340/174 LA, 340/174 M, 340/174 TL
[51] Int. Cl. G11c 7/02
[50] Field of Search 340/174 M

[56] References Cited
UNITED STATES PATENTS
3,432,835 3/1969 Foglia 340/174 M

*Primary Examiner*—James W. Moffitt
*Attorneys*—R. J. Guenther and Kenneth B. Hamlin ABSTRACT: The electrical format of a common mode rejection digit circuit for a magnetic memory is changed for reading and writing memory operations by means of multilateral diode bridge switches. A memory word circuit is coupled through memory storage devices to a data digit circuit and two canceling digit circuits associated therewith. The sense of coupling to the canceling circuits is opposite to one another. During writing operations, the data circuit is operated with a canceling circuit which is coupled to the word circuit in opposite sense from the data circuit, and during reading the data circuit is operated with a canceling circuit which is coupled to the word circuit in the same sense as the data circuit to assure equality of opposed shuttle noises in the common mode rejection circuits.

INVENTORS: P. A. HARDING
G. D. KRAFT
BY:
Charles Scott Phelan
ATTORNEY

MEMORY WIRING ARRANGEMENT WITH CHANGEABLE COMMON MODE REJECTION CIRCUIT LOOP

BACKGROUND OF THE INVENTION

1. Field of the Invention

This invention relates to a memory access arrangement using selectably different digit circuit noise cancellation arrangements for memory reading and writing operations.

2. Description of the Prior Art

It is usually desirable in nondestructive readout magnetic memories to provide for a higher degree of noise reduction than is normally required for destructive readout memories. This is necessitated by the fact that memory devices which are interrogated for nondestructive readout often produce a much smaller output signal than would the same devices if they were interrogated for destructive readout switching. For example, toroidal magnetic cores with rectangular hysteresis characteristics are known to be operable in a nondestructive readout mode by a differential permeability technique wherein one binary information state is represented by a predetermined one of the two remanent flux states of the core near saturation. The core displays low permeability in either such remanent flux state. Another binary information state is represented by a core flux state which is near the zero remanent flux level at which the core displays comparatively high permeability. When a core is in the latter state, the application of a signal of controlled amplitude and duration causes reversible flux switching to produce a readout signal without destroying the intermediate flux state of the core. Writing into a core which is to be operated in the differential permeability mode is realized by one of several techniques. Thus, either coincident fields are applied or a combination of coincident and linear select fields are applied in sequence. The fields may be single pulse or a train of pulses of decreasing duration or amplitude.

Various digit circuit arrangements are known for reducing readout noise without overdriving memory sense amplifiers during writing operations and without providing inordinately long time-guard intervals between reading and writing intervals. One useful digit circuit technique is the common mode rejection style of digit circuit which permits two-wire memory device operation for a low manufacturing cost. The two halves of a common mode rejection circuit are driven in parallel through a tap on the primary winding of a readout transformer to avoid amplifier overdrive. At the same time some form of word drive winding selection and actuation is employed during reading operations to assure actual readout from only one side of the selected common mode rejection digit circuit pair.

It is also known in the prior art to reduce capacitively coupled readout noise by employing common mode rejection-type digit circuits. However, inductively coupled shuttle noise remains somewhat of a problem because the ways known for reducing such noise are usually not compatible with other memory-operating needs. For example, when different word drive currents are used to drive data and canceling cores on opposite sides of a common mode rejection digit circuit, it is difficult to secure identical drives to both cores. Information-loading differences on the necessary two-word drive circuits cause different pulse configurations to be applied to each such core, and the driven cores are thus compelled to produce different shuttle noise configurations which result in imperfect cancellation thereof in the common mode rejection circuit. On the other hand, when a single-word drive circuit is used for applying readout drive, it has usually been necessary to employ two cores per information bit location in order to enhance the One or Zero readout signals with opposite polarities to obtain the desired signal-to-noise ratio.

It is, therefore, one object of the present invention to improve memory access techniques.

It is another object to improve memory output signal-to-noise ratios.

A further object is to reduce induced shuttle noises in memory output circuits without requiring a full two-cores-per-bit type of array.

Still another object is to reduce capacitively coupled noise output of magnetic memories.

SUMMARY OF THE INVENTION

The foregoing and other objects of the invention are realized in an illustrative embodiment in which the format of a common mode rejection type of digit circuit is changed for reading and writing operations. During a reading operation a data line is combined with a canceling line which is coupled through memory devices to receive inductively coupled signals in the same sense from a common word drive circuit. However, during writing operations the same data line is combined with a different canceling line to receive inductively coupled signals in opposite sense from the common word drive circuit.

It is one feature of the invention that bipolar diode bridge switch circuits are employed to modify the common mode rejection digit circuit configuration simultaneously for multiple-digit circuits.

It is another feature of the invention that digit circuits inductively coupled in the same sense to a common word circuit for reading are topologically arranged so that noise coupled from that word circuit by way of distributed capacitance is reduced because substantially the same noise is coupled to both such digit circuits in spite of distributed capacitive transmission line attenuation effects on word circuit signals.

BRIEF DESCRIPTION OF THE DRAWING

A more complete understanding of the invention may be obtained from a consideration of the following detailed description when taken in connection with the appended claims and the attached drawing in which:

DETAILED DESCRIPTION

Figure 1:
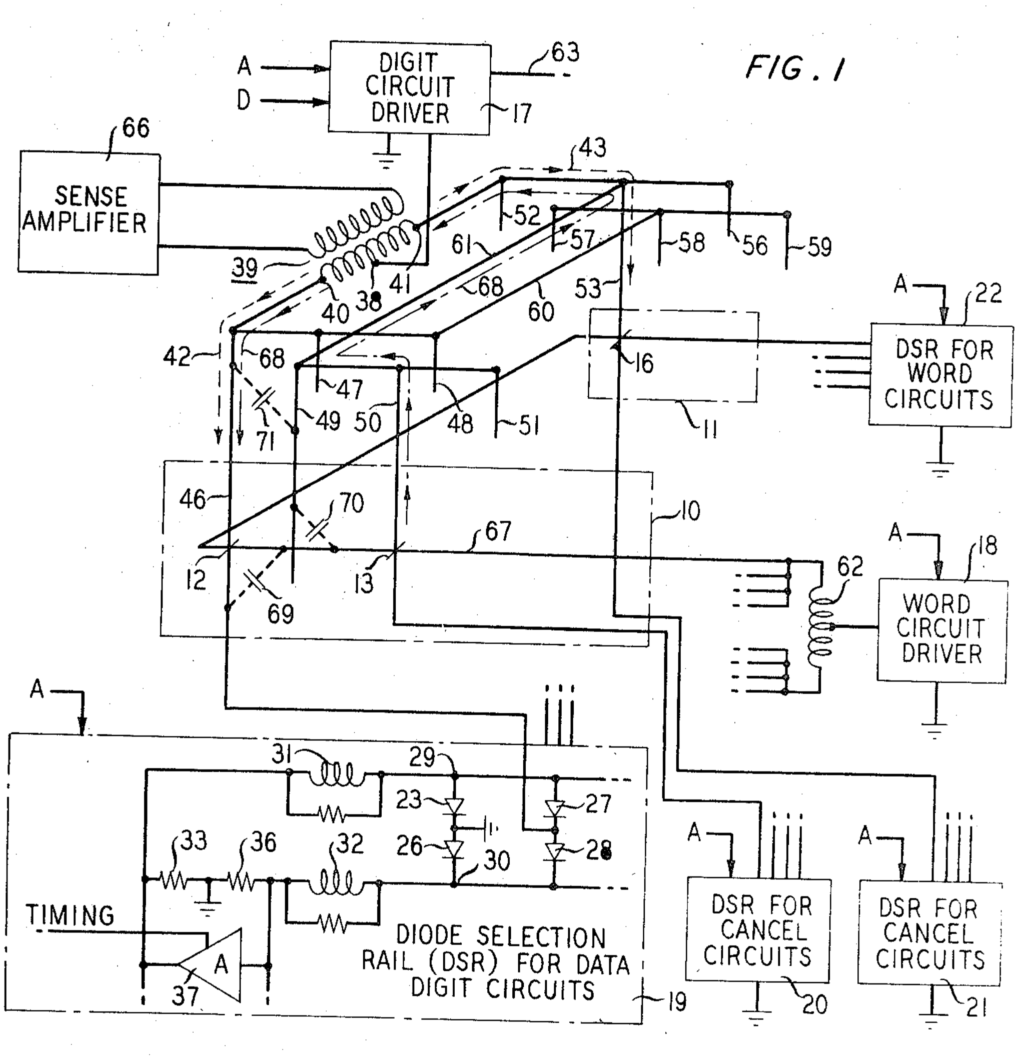
FIG. 1 is a simplified circuit diagram of a magnetic memory system in accordance with the invention.

FIG. 1 is a greatly simplified circuit diagram of memory and access circuits utilizing the present invention for a nondestructive readout magnetic memory system. The illustrated embodiment will be described in terms of an array of toroidal magnetic cores with rectangular hysteresis characteristics and arranged in a rectangular coordinate matrix of rows and columns, but the principles of the invention are not limited to such a specific format.

It is assumed that the memory system of FIG. 1 cooperates with and is controlled by a central processor, not shown, in a manner which is now well known in the art. Such a processor supplies timing signals, as well as address information signals on input leads A and data signals on input leads D.

As a matter of descriptive convenience, the invention is described as a modification of the two-way access memory in the copending application Ser. No. 701,172, filed Jan. 29, 1968, and now U.s. Pat. No. 3,560,943 which issued Feb. 2, 1971, in the name of P. A. Harding. Two planes, or mats, 10 and 11 of uniformly oriented cores are employed. Only three such cores 12, 13, and 16 are shown in FIG. 1 to illustrate the present invention, and these cores are shown in edge view and diagonally oriented from the lower left to the upper right of the drawing in that position. Each mat includes horizontal row circuits and vertical column circuits, only a small number of which are illustrated in FIG. 1; and such circuits are interconnected in a manner which will be hereinafter described to realize the objectives of the present invention. Thus, a common type of core mat is advantageously employed for all mats of the memory, and the same type of mat can also be employed for manufacturing convenience for destructive readout memory systems such as that shown in the aforementioned Harding application.

Digit circuit drivers such as the driver 17 shown in FIG. 1 function under common current source control to supply current to the memory column circuits, and similar drivers such as the driver 18 supply current to memory row circuits. The drivers 17 and 18 are advantageously of the same type used in the aforementioned Harding application. Thus, driver 17 responds to timing and address information from the central processor to produce drive current for a pair of column circuits in each memory bit position. A portion of one set of bit position column circuits is illustrated in FIG. 1. Data information from the central processor controls bypass switching arrangements which determine whether or not the selected pair of column circuits will actually get the available drive current for writing operations, but all selected column circuit pairs receive the current for a reset operation which precedes a writing operation. Drivers for adjacent pairs of bit positions function cooperatively through transformer selection logic to provide return current paths for one another during reset operations and during writing operations. Drivers 18 are essentially the same as drivers 17 except that no data control is required because the selected row circuit in every bit position receives drive current during each memory operation.

The most significant part of the address selection for each bit position is performed in the transformer logic of drivers 17. Similarly, the drivers 18 perform such partial address selection of row circuits within respective word positions. The remaining address selection is performed by diode selection rail (DSR) circuits 19, 20, 21, and 22 of the same general type employed in the Harding application and disclosed and claimed in the copending application Ser. No. 576,056, filed Aug. 30, 1966, and now U.S. Pat. No. 3,492,651, in the names of R. M. Genke, P. A. Harding, and M. W. Rolund.

Although details of the diode selection rail circuits are disclosed and claimed elsewhere, relevant portions of the circuit 19 are shown in FIG. 1 to facilitate an understanding of the present invention. Thus, the diode selection rail circuit 19 includes a multiarm diode bridge which provides simultaneous closure of plural circuits either through one another or through a ground connection on one arm of the bridge. This manner of operation avoids the need for either a costly transistor switch for each circuit closure, or a costly high-current transistor for closing a plurality of circuits at once. Two arms of such a bridge are shown in FIG. 1 and include a first diode pair 23, 26 and a second diode pair 27, 28, each connected in series between terminals 29 and 30. An intermediate terminal between the diodes 23 and 26 is connected to ground, and a corresponding terminal between diodes 27 and 28 is connected to one of the memory column circuits. Other arms of the bridge which are not shown are similarly connected to corresponding column circuits of other column circuit bit positions, also not shown in FIG. 1. Likewise, other column circuits in the portion of a bit position set shown in FIG. 1 are connected to arms of other diode selection rails.

The diode selection rail 19 is controlled by bias current applied through a transformer having secondary windings 31 and 32, connected in series between terminals 29 and 30, through a pair of resistors 33 and 36. The primary winding of the transformer is not shown, but it receives control current in accordance with address information supplied by the central processor as described in the aforementioned Genke et al. and Harding applications. Transformer action induces bias current in secondary windings 31 and 32 of appropriate polarity to bias all of the diodes connected thereto for conduction at the same time in closed loop circuits including the secondary windings and resistors 33 and 36. A center tap between the resistors is connected to ground. The resistors 33 and 36 are provided to develop a potential difference in response to the bias current therein for locking out other diode bridge gates, not shown, which are not selected by the aforementioned address information.

A timed amplifier gate 37 in FIG. 1 shunts the resistors 33 and 36 during the flat, peak portion of the bias drive pulse so that the secondary windings 31 and 32 see a lower impedance than that presented by the resistors 33 and 36. Consequently, the transformer draws less current to permit thereby easier transformer recovery with a small transformer core on bias current turnoff.

When bias current turns the diode selection rail 19 on, all circuits connected to diode arms of the bridge are returned through one of two types of paths to their respective drivers. A first type of path is through the ground branch 23, 26 to their respective digit circuit drivers. A second type is through a diode arm of another column circuit of a different bit position to the common driver transformer selection of those bit positions. The three other diode selection rails 20, 21, and 22 shown in FIG. 1 are the same as the diode selection rail 19, but they serve different memory coordinate circuits and are actuated by different address information bits.

Turning now to the digit circuits of the memory of FIG. 1, there are shown only a portion of the column circuits which are utilized in a single bit position actuated by the digit circuit driver 17. As previously indicated, the central processor supplies timing, address, and data signals to control the driver 17; and, on receipt of appropriate signals of those types, the driver supplies current, as illustrated in alternative forms in FIG. 2, to the illustrated memory column circuits. The latter current is applied to a center tap 38 of the primary winding on a readout transformer 39. Drive current splits at that tap, and half flows through each half of the primary winding to different column circuits connected to the respective end terminals 40 and 41 of the primary winding. This current flow for digit circuit drive is indicated schematically by the broken-line arrows 42 and 43. The current represented by arrow 42 flows to the subgroup of column circuits connected to terminal 40 and which are in the front plane 10. Current represented by the arrow 43 flows to the subgroup of column circuits connected to terminal 41 which are in the back plane 11. The particular column circuits in each plane which receive these current parts are determined by address information that controls the application of bias current in selected diode selection rails.

Column circuits 46 through 51 are in the front plane, and column circuits 52, 53, and 56 through 59 are in the back plane 11. Column circuit 46 is a data line and is connected to the diode selection rail 19, while column circuits 50 and 53 are cancellation lines and are connected to diode selection rails 20 and 21, respectively. Column circuits 47 and 58 are also advantageously employed as cancellation lines, but specific connections therefor are omitted from FIG. 1 to preserve the simplicity of the drawing and because such connections would be similar to those for the column circuits 50 and 53. Each of the illustrated column circuits is advantageously connected to a separate diode selection rail which also serves correspondingly located column circuits with corresponding data or canceling functions in other bit positions, not shown, of the memory. In addition, those same diode selection rails advantageously accommodate a further set of column circuits, not shown but of the same type as that illustrated and associated with a different readout transformer in embodiments in which transformer selection logic within the driver circuit 17 performs a part of the address responsive column circuit selection as hereinbefore mentioned.

It will be observed in FIG. 1 that column circuits 46 through 48 are connected to the terminal 40 of the readout transformer primary winding and lie in the front plane 10. An equal number of column circuits are connected to the same terminal 40 and comprise the subgroup of column circuits 57 through 59 in the back plane 11. The latter column circuits are connected to the terminal 40 by a lead 60. Similarly, the transformer terminal 41 is connected through a lead 61 to the subgroup of column circuits 49 through 51 in the front plane. Each subgroup of column circuits connected to a single transformer terminal and lying in a single plane includes only three column circuits in FIG. 1, but it advantageously includes more in actual practice. The center column circuit in any such subgroup is employed as a canceling circuit in a fashion similar to that which will be described in connection with circuits 50 and 53.

Since the cores in FIG. 1 in both of the planes 10 and 11 are all oriented in the same way, all of the column circuits pass through their respective sets of cores in the same way. However, different relative core linkage senses are established with respect to row circuits in the same cores, as will be hereinafter described.

In the row direction of the memory embodiment in FIG. 1 word circuit drivers such as the driver 18, which is of the same type as the driver 17 utilized for column circuits, supply current to row circuits of the memory. The driver 18 differs from the driver 17 in that address information controls both transformer logic and row circuit bypass logic because the ground return from a diode selection rail 22 to a driver 18 is completed through the bypass logic in the driver for an adjacent word location circuit served by such driver. In addition, each driver 18 includes logic responsive to central processor control for generating the different row circuit waveforms of FIG. 2. The output of driver 18 is applied to a center tap of a coil 62, although other impedance forms, or no impedance at all, could be employed for applying the driver output to subgroups of row circuits. All circuits from both terminals of the coil 62 lie in the front plane 10 and are interconnected at the left-hand side of that plane to corresponding row circuits in the back plane 11. The diode selection rail 22 responds to address input signals for selecting the desired row circuit. The word circuit diode selection rails each controls one corresponding row circuit from each of the plural word drivers. Likewise, each of the row circuits that is coupled to a common coil 62 is controlled by a different diode selection rail. One driver 18 and one diode selection rail 22 interconnected by a row circuit 67 extending through planes 10 and 11 are shown. Other word circuit drivers and selection rails not shown are similarly arranged to drive row circuits which are folded between the planes 10 and 11.

Figure 2:
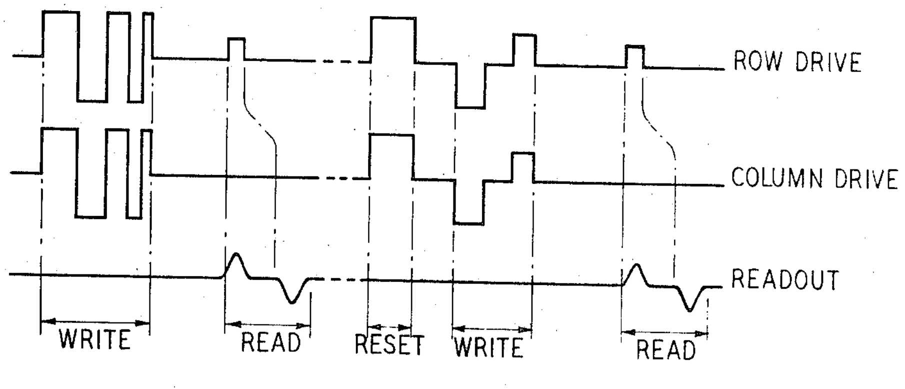
FIG. 2 is a family of voltage-versus-time wave diagrams, not drawn to scale, illustrating the operation of the system of FIG. 1.

An illustrative operating cycle for the memory of FIG. 1 will now be considered in terms of resetting, writing, and reading operations for the data core 12 in the front plane 10. The present embodiment contemplates the use of a resetting operation to precede a writing operation for positively establishing a selected data core in the predetermined one of its remanent flux states which is used to represent the binary Zero information state. This is accomplished by coincident row and column pulses as shown in FIG. 2. The circuit connections and current paths are the same as will now be outlined for a writing operation, but row drive current polarity is advantageously selected in the manner taught in the aforementioned Harding application to reset a particular one of the two cores that are driven in coincidence by a folded row circuit and a parallel-connected pair of column circuits.

In order to carry out a writing operation, the central processor supplies data signals to control digit circuit bypass switches in the digit driver 17 and corresponding drivers of other bit positions associated therewith as schematically represented by a horizontal broken line 63 in FIG. 1. Address information is similarly supplied to control transformer logic in the digit driver 17 and in the word driver 18, as well as controlling the application of bias current to appropriate diode rails of the data diode selection rails 19 and 22, and the cancellation diode selection rail 21 for cancellation circuit 53. Thus, a column cancellation line and data line are both closed to ground through the aforementioned diode selection rails 19 and 21 to form a common mode rejection-style digit circuit to avoid overdriving the sensing amplifier 66. This circuit forms a series closed loop including the primary winding of transformer 39, data line 46, the circuit closures in diode selection rails 19 and 21, and cancellation line 53; but current flows through the two halves of that loop in parallel from the center tap 38 to ground, as indicated by the broken line arrows 42 and 43. Since current flows in opposite directions in the primary winding from the terminal 38, there is no net voltage induced in the secondary winding and no possibility for overdriving a sensing amplifier 66 which is connected across that secondary winding.

The presence of the write drive currents in circuits 46 and 67 in coincidence establishes the core 12 in its so-called demagnetized state for representing the binary One condition. Each such current alone is insufficient to remove the core from its reset Zero state, but they are sufficient in aiding coincidence to write a One. If it were desired to represent a binary Zero condition the data signals would operate bypass switches in the driver 17 to prevent application of drive current to the column circuits 46 and 53 and leave core 12 in its reset state since the current in circuit 67 is of insufficient magnitude to switch the state of a core. During writing, the drivers 17 and 18 are operated in phase and with the same, or aiding, polarity with respect to the core 12 as illustrated by the left-hand trains of row and column drive pulses in FIG. 2. Those pulses are advantageously of uniform amplitude and decreasing pulse width to establish any cores receiving a coincidence of row and column drives in an essentially zero magnetization state in which the core is characterized by a much higher permeability than is evident in one of the saturation states. This form of writing signal is preferred over the two-pulse compensation type of writing signal, illustrated in the right-hand portion of FIG. 2 and in which the selected core is driven to zero magnetization and then driven back toward the reset saturation state by a pulse which is time and amplitude limited to secure an optimum permeability state, because the latter type of writing signals tolerate only a small range of variation in core characteristics. By contrast, the decreasing pulse train type of writing signal accommodates a broad range of variation in core characteristics.

When it is said that drive currents are applied in the same polarity to the core 12, it is meant that the row and column currents are of appropriate polarity to provide aiding magnetomotive forces to the core 12. Thus, in the case of the pulse train of decreasing width, the initial pulse in the column drive train flows from top to bottom in column circuit 46, and the initial pulse in the row drive train flows from left to right in row circuit 67 in the front plane 10. Although these pulse trains aid to establish a demagnetized state in the core 12, it will be apparent that they oppose one another in the cancellation core 16 in the back plane 11 so that the core 16 rests in its normal Zero state corresponding to the reset condition, which remains unchanged by the writing drive coincidence which it experiences simultaneously with the demagnetization of core 12.

To carry out a nondestructive reading operation of the data which is written in core 12, address information defines the same column circuit 46 to actuate the diode selection rails 19 and 22. However, now diode selection rail 21 is not activated, and cancellation circuit 53 is not utilized. This time cancellation diode selection rail 20 is selected for interconnecting cancellation line 50 with data line 46. The address information also causes the word driver circuit 18 to apply an interrogation pulse of predetermined amplitude, polarity, and rise time, the latter polarity being preferably the same as the reset drive polarity as shown for both cases in FIG. 2, for the appropriate row circuit 67. The opposite polarity is advantageously employed to read out a core on the part of circuit 67 in plane 11. Predetermined rise time is that determined experimentally to produce optimum readout voltage magnitude with minimum inductively coupled noise from the selected row circuit to the selected column circuits for the particular cores and array configuration employed.

Limitations on the word driver readout pulse amplitude and duration are advantageously established to produce maximum reversible flux switching in cores of the type employed in the memory without producing significant irreversible flux switching for the range of core characteristic variations expected for cores to be used in the memory. This readout pulse is applied on a linear select basis to the word circuit only. Thus, all cores coupled, for example, to the row circuit 67 are similarly interrogated by the readout pulse when core 12 is interrogated. The principal readout signal is produced by the reversible flux switching in the core 12 for inducing in column circuit 46, and in the associated closed-loop digit circuit including cancellation column circuit 50, a current that flows in that loop circuit as indicated by the dash-dot arrows 68 in FIG. 1. This current causes a corresponding potential difference to be developed between terminals 40 and 41 of the readout transformer primary winding to produce a similar readout signal to the sense amplifier 66.

Signal produced by switching core 12 is bipolar with a pulse corresponding to each of the leading and trailing edges of the read interrogation pulse in the row circuit linking that core. Sense amplifier 66 is adapted to respond to only one polarity of the readout signal. In one embodiment a 300-milliampere, decreasing width, alternating polarity, pulse train was used to write on row and column circuits. A row circuit interrogation pulse of about 100-milliampere and 200-nanosecond duration with about a 50-nanosecond rise time produced One readout pulses of about 3-milliampere amplitude. Coincident reset pulses of about 300-milliampere amplitude and 1.5-microsecond duration were used to restore a Zero state.

The canceling core 13, on canceling circuit 50, produces a corresponding readout shuttle noise which opposes the current represented by the arrows 68 since word circuit 67 links cores 12 and 13 in the same sense with respect to column circuits 46 and 50. However, since the cores 12 and 13 are actuated by the same read drive current pulse in their common word drive circuit 67, and since the configuration of that current pulse is controlled by the information loading of circuit 67 by all cores coupled to such circuit in the same way for both of the cores 12 and 13, they both produce the same type of shuttle noise output signal. Accordingly, if a Zero is stored in the core 12, the shuttle noise cancellation in the digit circuit readout loop is essentially complete insofar as inductively induced noise components are concerned, much more so than would be the case if the data and canceling cores were actuated by currents in different circuits with different information loading. If the data core 12 is storing a binary One, its induced output signal is substantially in excess of the canceling core 13 output and overrides the effect of the latter. There is, of course, some slight reduction in the magnitude of this binary One output signal, but from a percentage standpoint the reduction of the binary Zero noise output of the data core 12 is much greater than the reduction of the binary One output with the result that a substantial improvement in readout signal-to-noise ratio is realized. The improvement mentioned was found to be produced as compared to circuits in which the data and canceling cores were actuated by word currents in different circuits.

It is well known in the art that during memory readout operations of the type just described there is a capacitively coupled noise signal which appears in the digit circuit as a result of coupling through distributed capacitance associated with the word drive circuit. This distributed capacitance produces a transmission line attenuation effect upon the word drive signal in the circuit 67; but since the data core 12 and canceling core 13, and their associated column circuits 46 and 50, are quite close together along the circuit 67, as compared to the total length of that circuit, the noise coupled through the distributed capacitance to the circuits 46 and 50 at the cores 12 and 13 is substantially the same and is for practical purposes canceled at the readout transformer primary winding. The distributed capacitance along the entire word circuit 67 for the planes 10 and 11 is schematically represented by the capacitors 69 and 70 which are connected by broken-line leads between the circuit 67 and the circuits 46 and 49, respectively.

It was previously noted that all cores along the circuit 67 receive the linear select readout drive signal; but, since their respective column circuits are not closed through diode selection rails, there is no major inductively produced current component at the transformer 39 to interfere with the component from the data core 12. There is, of course, some possible coupling through line-to-line distributed capacitance between column circuits of the memory. This capacitance is schematically represented for the entire memory by a capacitor 71 connected by broken line leads between column circuits 46 and 49. Coupling through such line-to-line capacitance has been found to be insignificant in the illustrated embodiment for two reasons. In the first instance, it is small because both sides of any such distributed capacitance between column circuits are simultaneously moving in the same direction and by similar amounts as a result of the readout drive so that there is little or no practical signal coupling between column circuits as a result of this factor. In the second instance, and to the extent that there is any such signal coupling, the magnitude of such coupling which reaches the data column circuit 46 and the canceling column circuit 50 is similar because column circuits connected to one side of a readout transformer are separated from one another by column circuits which are connected to the other side of the same transformer. Consequently, similar noises are produced and are canceled out by common mode rejection in the readout transformer primary winding.

It will be seen from the foregoing description that one column canceling circuit is included in each column circuit subgroup which is connected to one end terminal of the associated readout transformer primary winding and which lies in one plane. A cancellation circuit is connected into a reading digit common mode rejection circuit when any data line in a subgroup in the same plane and connected to the opposite end terminal of the same transformer as that cancellation circuit is to be read out. However, a cancellation circuit is used in a writing digit common mode rejection circuit when any data line in a subgroup in a different plane from the cancellation circuit, and connected to the opposite end terminal of the same transformer, is to be written. These cancellation circuit selection rules follow from the fact that folded word circuits link uniformly oriented cores in one plane in the same sense for all column circuits and in the other plane in the opposite sense for all column circuits.

What is claimed is:

1. In combination,
a plurality of memory devices arranged in rows and columns,
a plurality of row circuits each inductively coupled to a different row of said devices,
a plurality of column circuits each inductively coupled to a different column of said devices, and
means connecting a selected one of said column circuits in different series closed-loop circuits with only a first further one of said column circuits in a first time interval and with only a second further one of said column circuits in a second time interval.

2. The combination in accordance with claim 1 in which
said row and column circuits are operable to write information into said devices in said first interval and to read said information out of said devices in said second interval,
said row circuits are arranged in pairs of first and second row circuits and means are provided in each such row circuit pair for connecting the row circuits of the pair in series, and
each of said row circuit pairs includes means for coupling said first row circuit of the pair through one of said devices to said first column circuit and means for coupling said second row circuit of the pair through another one of said devices to said second column circuit in opposite sense with respect to device coupling between said first row and first column circuits.

3. The combination in accordance with claim 1 in which
a transformer is provided with a primary winding connected in series in both of said different series loop circuits, and
said selected circuit is connected to one end terminal of said primary winding and said first and second circuits are both connected to another end terminal of said primary winding.

4. The combination in accordance with claim 3 in which said connecting means comprises circuit-closing switch means selectively connecting an end of said selected circuit which is remote from said transformer to a corresponding end of a different one of said first and second circuits in said first and second intervals, respectively.

5. The combination in accordance with claim 1 in which said selected column circuit and said second column circuit are coupled through said devices to the same row circuit of a series-connected row circuit pair and in the same sense with respect to such row circuit,
distributed capacitance along each of said row circuits causes a significant transmission line signal attenuation effect therealong for row drive signals to said devices, and
said selected circuit and said second circuit are arranged electrically close to one another along any of said row circuits which are common thereto so that signals coupled to each of said selected and second circuits through said distributed capacitance are essentially the same.

6. The combination in accordance with claim 1 in which each of said memory devices is switchable to a predetermined flux state upon the application thereto of predetermined coincident aiding magnetomotive forces applied from selected ones of said row and column circuits that are coupled thereto,
said row circuits are arranged in pairs of first and second row circuits and means are provided in each pair for connecting the row circuits of the pair in series, and
said column circuit-connecting means comprises
means for interconnecting selected and second column circuits which are coupled through two of said devices to the same one of said row circuits so that energization of such row circuit in said second interval inductively disturbs both of said devices in the same direction whereby the net column circuit closed loop signal represents the difference between signals induced in such loop by such disturbances, and
means interconnecting said selected and first column circuits which are coupled through two of said devices to different row circuits of a series-connected pair so that said coincident magnetomotive forces in said first interval switch one of such devices coupled to said selected row and column circuits but inhibit switching of one of such devices coupled to said first column circuit and the last-mentioned row circuit pair.

7. The combination in accordance with claim 1 in which said memory devices are toroidal magnetic cores, and
all of said cores are geometrically uniformly arranged in said rows and columns.

8. The combination in accordance with claim 1 in which said memory devices are magnetic members having substantially rectangular hysteresis characteristics, and
said row and column circuits receive signals for operating said members in a differential permeability mode of operation wherein the first binary information state is represented by one remanent flux state near a magnetically saturated point of said characteristic where such member evidences low permeability and said second binary information state is represented by an intermediate flux state between magnetic saturation states of said characteristic, and wherein said member evidences much higher permeability.

9. The combination in accordance with claim 8 in which means are provided to apply coincident alternating polarity pulse trains of decreasing pulse width to selected ones of said row and column circuits to write a magnetic device at the intersection of such selected row and column circuits to said second binary information state, and
means applying a pulse of predetermined amplitude and duration to said selected row circuit to read out said second information state nondestructively.

10. The combination in accordance with claim 8 in which means apply coincident pulses of a first polarity and of predetermined amplitude and duration to selected row and column circuits to drive a selected one of said devices to an essentially zero magnetization state,
means applying coincident pulses of a second polarity and predetermined amplitude and duration to said selected device to drive such device to said intermediate flux state, and
means applying a pulse of predetermined amplitude and duration to said selected row circuit to read out said second binary information state nondestructively.

11. The combination in accordance with claim 1 in which said first and second column circuits are coupled through said devices to different ones of said row circuits,
means connect pairs of said different row circuits in series with one another, and
means are provided to apply drive signals to a selected pair of said series connected row circuits, said applying means comprising
a drive pulse source,
means connecting an output of said source in multiple to one end of each of a plurality of said series connected pairs of row circuits, and
means selectively connecting another end of one of said plurality of series connected pairs of said row circuits back to said source.

12. The combination in accordance with claim 1 in which said selected column circuit is a data line,
said first and second column circuits are canceling lines, and said plurality of column circuits includes multiple data and canceling lines selectably associated through said connecting means in respective pairs of closed loop circuits like said different series closed loop circuits,
said connecting means includes at least one data line selecting switch and at least two similar canceling line selecting switches, each of said switches comprising a multiarm diode bridge switch including a first arm connected to ground and a plurality of additional arms each connected to a different one of said column circuits, each of said switches further comprising means biasing all of the arms thereof for conduction for thereby simultaneously connecting each column circuit connected thereto to ground and to other ones of said column circuits that are connected thereto, and
said connecting means further includes means actuating said biasing means of a data line switch and of a first and second one of said canceling line switches for canceling lines in said loop circuits with data lines on such data line switch in said first and second intervals, respectively, for forming said closed loop circuits.

13. The combination in accordance with claim 12 in which means connect together at a first data line end a plurality of said data lines each having another end thereof connected to a different data line switch,
means connecting together at a first canceling line end a plurality of said canceling lines, a first half of such canceling lines having another end thereof connected to a different one of a first set of said canceling line switches and a second half of such canceling lines having another end thereof connected to a different one of a second set of said canceling line switches, and
the first-mentioned connecting means includes means actuating biasing means of at least one of said data line switches in coincidence with at least one of said first set of canceling line switches in said first interval and with at least one of said second set of canceling line switches in said second interval for accessing a group of said devices.

14. The combination in accordance with claim 1 in which said selected circuit is a data line, said first and second circuits are canceling lines, and said plurality of column circuits includes multiple data and canceling lines associated through said connecting means in respective pairs of closed loop circuits like said different series closed-loop circuits, transformer means are provided for associating data lines with canceling lines in respective loop circuits, said transformer means including a plurality of transformers each having a primary winding with a plurality of data lines connected to at least one end terminal thereof, and means connect at least two of said canceling lines to another primary winding end terminal opposite to a terminal to which data lines are connected, each such pair of canceling lines being the first and second further column circuits for all of said data lines which are connected to the opposite terminal of the same primary winding.

15. The combination in accordance with claim 14 in which said memory devices include first and second groups of devices, each column circuit is coupled to devices in only one group, and each row circuit is coupled to devices in both said device groups, and of said data lines which are connected to any terminal of a transformer primary winding, a first subgroup of such data lines are coupled to said first group devices and a second subgroup of such data lines are coupled to said second group devices.

16. The combination in accordance with claim 15 in which a different one of said canceling lines is included in each of said subgroups, and each of said canceling lines is connectable by said connecting means in a closed loop with a data line connected to the opposite terminal of the same transformer and in a different column circuit subgroup but to devices in the same device group with devices coupled to such data line in said first interval and to devices in a different device group from devices coupled to such data line in said second interval.

17. The combination in accordance with claim 15 in which significant distributed capacitance is present along each of said row circuits and produces transmission line attenuation effects on signals in said circuits, and the last-mentioned data lines which are connected to a transformer primary winding and are coupled to devices in one of said device groups are alternated along said row circuits with data lines connected to a different end terminal of such primary winding but coupled to devices of the same one of said groups whereby signals coupled to adjacent column circuits from a row circuit by way of said distributed capacitance are substantially the same.

18. The combination in accordance with claim 1 in which means apply row drive signals to a selected one of said row circuits in said first interval in coincidence with column drive signals to said selected circuit and said first further circuit in parallel to store information in the one of said devices at an intersection of said selected row and column circuits, and means apply a row drive signal to said selected row circuit in said second interval to produce nondestructive readout of information stored in the last-mentioned device by inducing an information representative readout signal in the closed loop of said selected and second column circuits.

* * * * *